United States Patent
Washburn et al.

(10) Patent No.: US 7,632,229 B2
(45) Date of Patent: Dec. 15, 2009

(54) RANGE DEPENDENT WEIGHTING FOR SPATIAL COMPOUND IMAGING

(75) Inventors: Michael Joseph Washburn, Brookfield, WI (US); Feng Lin, Waukesha, WI (US)

(73) Assignee: General Electric Company, Schenectady, NY (US)

(*) Notice: Subject to any disclaimer, the term of this patent is extended or adjusted under 35 U.S.C. 154(b) by 553 days.

(21) Appl. No.: 10/914,326

(22) Filed: Aug. 9, 2004

(65) Prior Publication Data
US 2006/0030776 A1     Feb. 9, 2006

(51) Int. Cl.
*A61B 8/00*     (2006.01)
*A61B 8/12*     (2006.01)
*A61B 8/14*     (2006.01)

(52) U.S. Cl. .............. 600/437; 600/441; 600/443; 73/584; 73/587; 73/596; 73/609; 73/618; 73/620; 73/627; 73/631; 73/645

(58) Field of Classification Search ............ 600/437, 600/441, 443; 73/584, 587, 596, 609, 618, 73/620, 627, 631, 645
See application file for complete search history.

(56) References Cited

U.S. PATENT DOCUMENTS

| | | | | |
|---|---|---|---|---|
| 5,111,824 A * | 5/1992 | Lazenby et al. | ............ | 600/447 |
| 5,353,354 A * | 10/1994 | Keller et al. | ............ | 382/128 |
| 5,462,057 A * | 10/1995 | Hunt et al. | ............ | 600/447 |
| 5,908,390 A * | 6/1999 | Matsushima | ............ | 600/447 |
| 6,193,662 B1 * | 2/2001 | Hwang | ............ | 600/447 |
| 6,228,031 B1 * | 5/2001 | Hwang et al. | ............ | 600/447 |
| 6,315,723 B1 * | 11/2001 | Robinson et al. | ............ | 600/443 |
| 6,432,056 B1 * | 8/2002 | Cooley et al. | ............ | 600/443 |
| 6,508,770 B1 * | 1/2003 | Cai | ............ | 600/447 |
| 6,530,885 B1 * | 3/2003 | Entrekin et al. | ............ | 600/437 |
| 2003/0149357 A1 * | 8/2003 | Liu | ............ | 600/437 |
| 2005/0053308 A1 | 3/2005 | Sabourin et al. | | |
| 2005/0101865 A1 | 5/2005 | Hao et al. | | |
| 2006/0293596 A1 * | 12/2006 | Jago et al. | ............ | 600/437 |

* cited by examiner

*Primary Examiner*—Brian Casler
*Assistant Examiner*—James Kish
(74) *Attorney, Agent, or Firm*—McAndrews, Held & Malloy, Ltd.; Peter J. Vogel; Michael A. Dellapenna

(57) ABSTRACT

A system and method for range dependent weighting in ultrasound imaging. The system includes a transducer array, a data acquisition system, and an imaging processor. The transducer array receives a first ultrasound beam having a first focal depth. The data acquisition system receives a first ultrasound imaging signal from the array. The first signal includes first image data based on at least the first ultrasound beam. The imaging processor combines a first data contribution from the first image data with at least second image data from a second ultrasound imaging signal to create a spatially compounded image. The first data contribution is based on at least the focal depth of the first beam.

20 Claims, 6 Drawing Sheets

RANGE DEPENDENT WEIGHTING FOR SPATIAL COMPOUND IMAGING

BACKGROUND OF THE INVENTION

The present invention generally relates to ultrasound imaging. In particular, the present invention relates to a system and method for range dependent weighting for ultrasound spatial compound imaging.

Conventional ultrasound imaging systems acquire ultrasound images of the same anatomy at several angles. Data from these images are then combined to form a single, composite image such as a spatially compounded image. The combination of the image data may occur using equal contributions from each image (for example, using equal weighting of image data from all images). The combination of the image data may also occur by using a greater data contribution from some images (for example, using greater weighting of image data from some images) and lesser data contributions from other images (for example, using lesser weighting of image data from some images).

For example, conventional imaging systems may employ regional input frame weighting. FIG. 6 illustrates a schematic diagram demonstrating regional input frame weighting. A transducer array receives ultrasound beams, which may be employed to generate one or more of input frames 610, 620, 630. Each of input frames 610, 620, 630 can be obtained at different angles, or steering angles. For example, input frame 610 is a left steered frame, input frame 620 is a non-steered frame and input frame 630 is a right steered frame.

The three image frames 610, 620, 630 may be combined into a compounded image. Image data sections 641, 643, 645, 647, 649 represent the combined image data from frames 610, 620, 630. Data sections 643, 645, 647 represent the spatially compounded image. Due to the shape of image frames 610, 620, 630, data section 643 includes image data from frames 610 and 620, data section 647 includes image data from frames 620 and 630, and data section 645 includes image data from frames 643, 645, and 647.

With equal weighting and normalization to provide uniform image brightness, a spatially compounded image typically includes 50% of image data from frames 610 and 620 for image data sections 643 and 647. Similarly, the compounded image typically includes 33% of image data from frames 610, 620 and 630.

If all three frames 610, 620, 630 have equal weighting (for example, regional input weighting is not applied), the left edge of the right steered frame 630 and the right edge of the left steered frame 610 can be visible in the compounded image (represented by data sections 643, 645, 647), especially if there is probe or anatomical motion. This visibility may be mitigated by reducing the weighting of the right steered image frame 630 as it gets closer to the left edge of the data section 645 and increasing the corresponding weighting of the image data from frames 620 and 610 in the same data section 645.

However, the near field portion of compounded ultrasound images often suffer from image artifacts caused by the reverberation of ultrasound beam waveforms off of common near field anatomical structures. The near field portion generally includes portions of an anatomy relatively close to the surface of the anatomy, such as a patient's skin. Near field anatomical structures causing such reverberation typically include fat layers and muscle, for example. Such structures are typically perpendicular to ultrasound waveforms in the near field.

Current ultrasound imaging systems may scan the imaged anatomy at multiple angles, as described above. The angled beam firings generate less reverberation artifacts. By weighting the higher-angled image frames more and lesser-angled frames less in the compound image, the effects of reverberation can be reduced. As reverberation is only an imaging problem in the near field, applying range-dependent weighting of image frames can be applied to further reduce reverberation artifacts in spatially compounded images. Reducing the amount of data being used to generate the compound image in the near field results in a lower level of compounding in the near field compared to the rest of the image. Range-dependent weighting can allow near field artifacts to be reduced without sacrificing any aspect of the image in the mid- and far fields. Such weighting can make the speckle pattern over the image range more uniform.

In addition, range-dependent weighting can provide for a more uniform image over an image range. Curved linear probes, by nature of their geometry, result in image vectors that are closer together in the near field and then spread out with depth. At typical image spacing, this results in the near-field speckle pattern that is finer than the far field speckle pattern. Spatial compounding has the effect of smoothing out the speckle pattern in the image. Because the near field speckle pattern is already finer than the mid and far field, the compounding image can appear much smoother in the near field than in the far field. Meanwhile, due to the limited size of probe apertures, an image usually looks un-focused and blurred in the far field. The blurriness can be further amplified by spatial compounding. The image may therefore not have a uniform appearance in range and may consequently not be well received by a user. By applying range-dependent weighting to image data, a more uniform image may be produced. Specifically, by reducing the contribution of image data from certain angles in the near field, less speckle reduction may be achieved. In addition, by reducing the contribution of certain angles in the far field can cause less blurring. Combining these two can result in a more uniform image.

Thus, a need exists for a system and method for range dependent weighting in ultrasound spatial compound imaging. Such a system and method can provide for a reduction in image artifacts caused by waveform reverberation from near field anatomical structures. In addition, such a system and method can make a speckle pattern of an ultrasound image more uniform over the image range.

BRIEF SUMMARY OF THE INVENTION

The present invention provides a system for range dependent weighting in ultrasound imaging. The system includes a transducer array, a data acquisition system, and an imaging processor. The transducer array receives a first ultrasound beam having a first focal depth. The data acquisition system receives a first ultrasound imaging signal from the array. The first signal includes first image data based on at least the first ultrasound beam. The imaging processor combines a first data contribution from the first image data with at least second image data from a second ultrasound imaging signal to create a spatially compounded image. The first data contribution is based on at least the focal depth of the first beam.

The present invention also provides a method for applying range dependent weighting to ultrasound imaging. The method includes receiving a first ultrasound imaging signal and combining a first data contribution from first image data with at least a second data contribution from second image data to create a spatially compounded image. The first imaging signal is based on at least a first ultrasound beam and includes first image data. The first beam includes a focal depth. The second image data is based on at least a second ultrasound imaging signal. The first data contribution is based on at least the focal depth.

The present invention also provides a method for weighting data contributions to a compounded image. The method includes reducing a first image data contribution to a compounded image by a first factor and combining the first image data contribution and a second image data contribution to create a compounded image. The first factor is based on at least a focal point.

Figure 1:
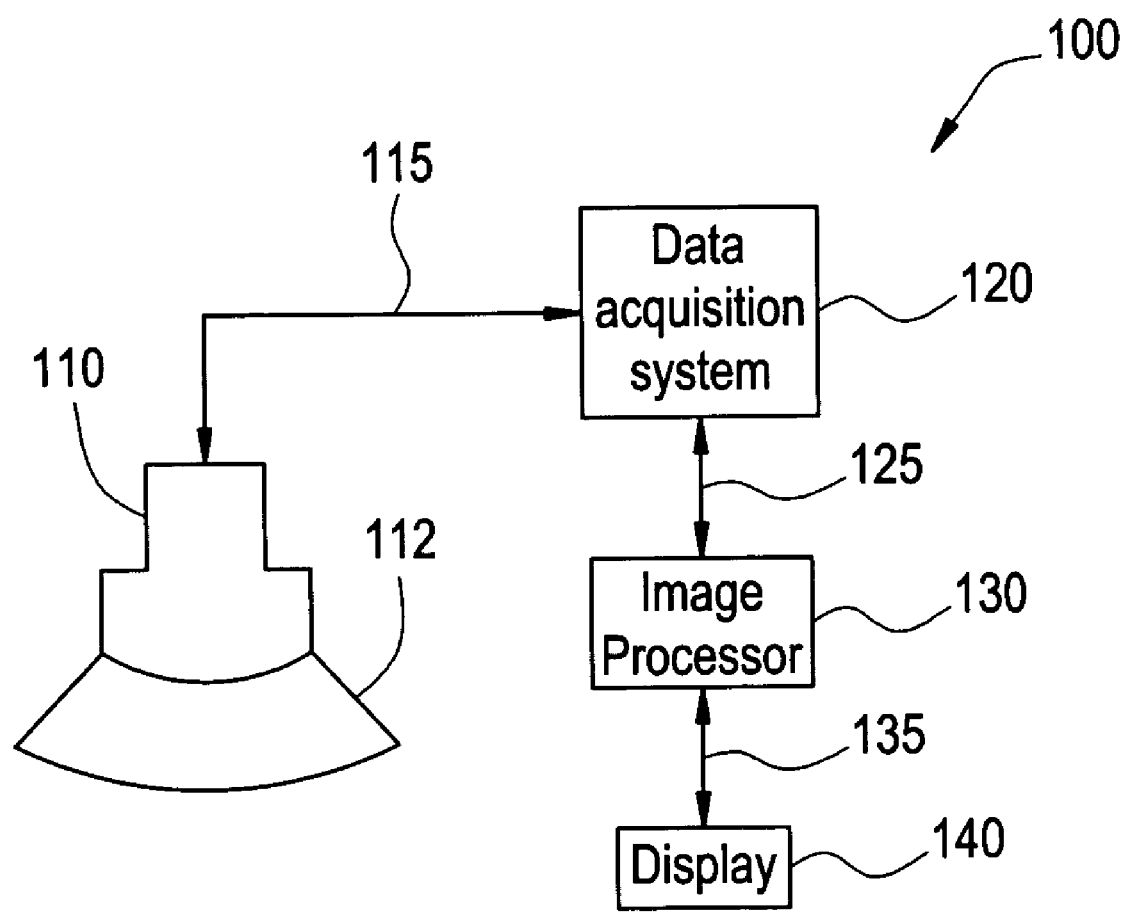
FIG. 1 illustrates a schematic diagram of an ultrasound imaging system used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a schematic diagram of an ultrasound imaging system 100 used in accordance with an embodiment of the present invention. System 100 includes an ultrasound transducer 110, a data acquisition system 120, an image processor 130, and a display 140.

Transducer 110 can transmit and receive ultrasound beams 112. Ultrasound beams 112 can include a focal depth. A focal depth can include, for example, an interior area of a patient or object being imaged. The focal depth can be the point at which ultrasound beams 112 emitted from transducer 112 are focused to provide an ultrasound image 135.

Ultrasound imaging signals 115 are communicated between transducer 1 10 and data acquisition system 120. Ultrasound imaging signal 115 can include ultrasound image data 125. Ultrasound image data 125 is communicated between data acquisition system 120 and image processor 130. Ultrasound image 135 is communicated between image processor 130 and display 140.

Transducer 110 can include any transducer array commonly known in the art that is capable of transmitting and receiving ultrasound beams 112. In operation, after receiving an ultrasound beam 112, transducer 110 communicates ultrasound imaging signal 115 to data acquisition system 120. Ultrasound imaging signal 115 can be an electronic signal based on at least an ultrasound beam 112 received at transducer 110. For example, imaging signal 115 may include an electronic signal that indicates the strength of an ultrasound beam 112 received at transducer 110. In this way, imaging signal 115 can represent the received ultrasound beam 112.

Data acquisition system 120 can include any processor capable of receiving imaging signal 115. For example, data acquisition system 120 can include a computer processor with loadable or embedded software capable of receiving imaging signal 115. Once data acquisition system 120 receives imaging signal 115, data acquisition system 120 processes imaging signal 115 to determine imaging data 125.

Imaging data 125 can include electronic data representative of an ultrasound image. Imaging data 125 can include one or more image frames of a spatially compounded ultrasound image. For example, imaging data 125 can include a single frame or multiple frames of a spatially compounded image.

Data acquisition system 120 then communicates imaging data 125 to image processor 130. Image processor 130 can be any processor capable of processing image data 125 in order to create a viewable ultrasound image 135. For example, image processor 130 may be a computer processor with loadable or embedded software capable of receiving image data 125 and creating a viewable ultrasound image 135.

Image processor 130 may receive one or more frames of a spatially compounded image included in image data 125. Image processor 130 may also combine individual image frames in image data 125 in order to create a spatially compounded image. In addition, as described below, image processor 130 may determine a contribution from one or more image frames to a spatially compounded image.

Image processor 130 then communicates ultrasound image 135 to display 140. Once display 140 receives image 135, display 140 may present image 135 on a screen or other medium viewable to one or more users. For example, display 140 may include a computer or CRT screen capable of displaying ultrasound image 135.

One or more of data acquisition system 120, image processor 130 and display 140 may be included in a single physical component. For example, data acquisition system 120 and image processor 130 may be embodied in a single computer including one or more processors and a memory. In addition, for example, all three of data acquisition system 120, image processor 130 and display 140 may be embodied in a single computer including one or more processors, a memory and a computer screen.

As described above, image data 125 can correspond to an imaging signal 115 communicated between transducer 110 and data acquisition system 120. Also as described above, imaging signal 115 can correspond to an ultrasound beam 112, and therefore an image frame of a spatially compounded image. In this way, image data 125 can correspond to an image frame of a spatially compounded image 135.

Image processor 130 can determine a contribution of image data 125 to a spatially compounded image 135. A contribution can include a weighting of image data 125 to be combined with other image data 125 to create a spatially compounded image 135. For example, image processor 130 can determine that a first image data 125 from a first ultrasound signal 115 (and a first ultrasound beam 112) contributes a fraction of a contribution of second image data 125 from a second ultrasound signal 115 (from either the first ultrasound beam 112 or another ultrasound beam 112). The contribution from first image data 125 can be determined by multiplying first image data 125 by a numerical factor.

For example, image processor 130 may decrease a contribution of first image data 125 to a spatially compounded image by multiplying first image data 125 by a factor of less than one, such as 0.2. Another contribution to image 135 from second image data 125 may be similarly increased or decreased. In effect, the resultant spatially compounded image includes a lesser contribution from the first image data 125.

Conversely, image processor 130 may increase a contribution of first image data 125 by multiplying first image data 125 by a numerical factor greater than one, such as 1.2. Another contribution to image 135 from second image data 125 may be similarly increased or decreased. In effect, the resultant spatially compounded image 135 includes a greater contribution from the first image data 125.

Image processor 130 can base a contribution to a spatially compounded image 135 on the range or focal depth of the corresponding ultrasound beam 112. For example, image processor 130 may include one or more mathematical relationships between a contribution or weighting factor and a range or focal depth of an ultrasound beam 112. Image processor 130 may employ a mathematical relationship to determine a contribution or weighting factor based on at least a focal depth, for example.

Figure 2A:
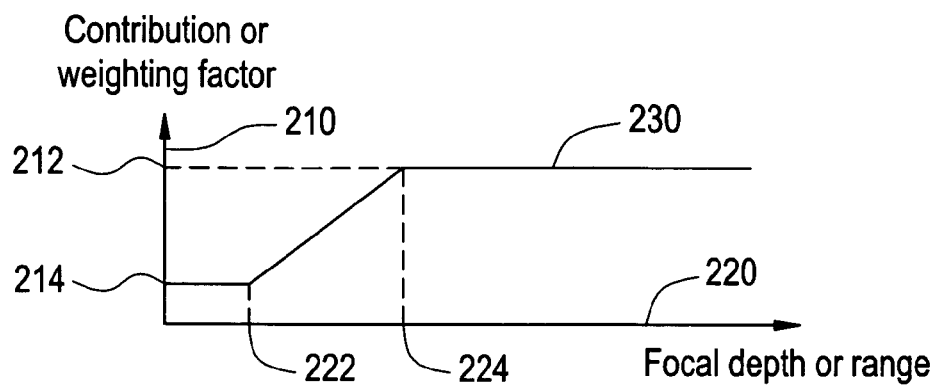
FIGS. 2A, 2B and 2C illustrate graphical representations of relationships between a contribution or weighting factor and a focal depth or imaging range of an ultrasound beam.
Figure 2B:
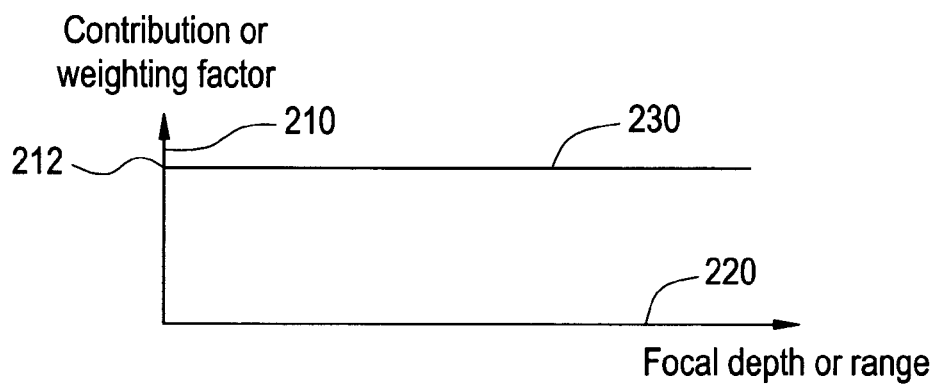
Figure 2C:
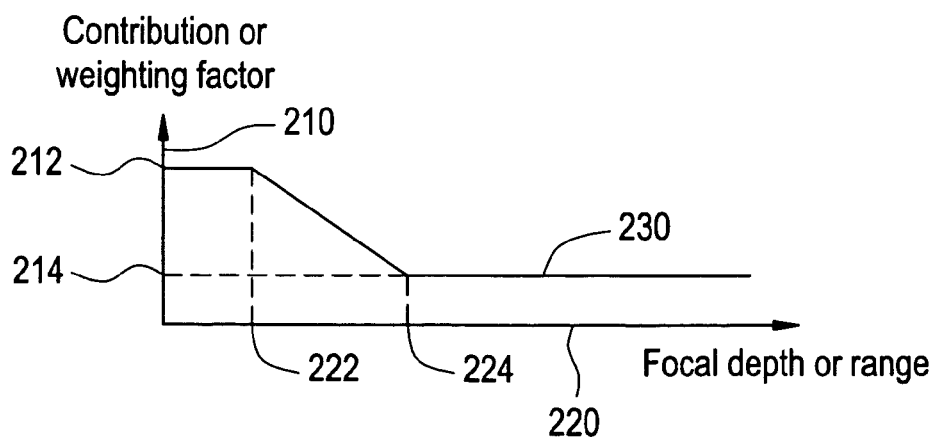

FIGS. 2A, 2B and 2C illustrate graphical representations of relationships between a contribution or weighting factor and a focal depth or imaging range of an ultrasound beam 112. FIGS. 2A, 2B and 2C each include an axis 210 representing a contribution or weighting factor, an axis 220 representing a focal depth or imaging range, and a curve 230 representing a relationship between the weighting factor and range or focal depth. Image processor 130 may employ curve 230 from any one of FIGS. 2A, 2B and 2C to determine a contribution or weighting factor based on at least a focal depth or imaging range. Curve 230 illustrated in FIGS. 2A, 2B and 2C is intended merely as an example, and is not intended to introduce any limitations on the present invention.

FIG. 2A also includes two weighting factors 212, 214 and two focal depths 222, 224. Image processor 130 may know a focal depth for an ultrasound beam 112 based on input from a user, for example. In another embodiment, a focal depth for an ultrasound beam 112 may be included in imaging signal 125 and communicated to image processor 130 from data acquisition system 120.

Image processor 130 uses the known or communicated focal depth to determine a weighting factor by applying curve 230 to the focal depth. For example, in FIG. 2A, a focal depth 222 results in image processor 130 applying factor 214 to image data 125, as described above. Similarly, a focal depth 224 results in image processor 130 applying factor 212 to image data 125. In this way, curve 230 of FIG. 2A can result in image processor 130 applying a smaller factor to image data 125 received from ultrasound beams 112 with smaller focal depths. Conversely, curve 230 of FIG. 2A can result in image processor 130 applying a larger factor to image data 125 received from ultrasound beams 112 with larger focal depths. Applying curve 230 of FIG. 2A to a non-steered beam 112 therefore results in image data 125 in the near field (or smaller imaging range) of the non-steered beam 112 being weighted less and gradually "ramped up" to full weighting in larger imaging ranges, for example. In this way, determining and applying a weighting factor to image data 125 based on at least a focal depth may be considered range dependent weighting of image data. The reduced weighting on image data 125 from the non-steered beam 112 in the near field can result in a more uniform image 135, as described above.

Similarly, in FIG. 2C, a focal depth 222 results in image processor 130 applying factor 212 to image data 125, as described above. Similarly, a focal depth 224 results in image processor 130 applying factor 214 to image data 125. In this way, curve 230 of FIG. 2C can result in image processor 130 applying a larger factor to image data 125 received from ultrasound beams 112 with smaller focal depths. Conversely, curve 230 of FIG. 2A can result in image processor 130 applying a smaller factor to image data 125 received from ultrasound beams 112 with larger focal depths.

Curve 230 of FIG. 2B can result in image processor 130 applying the same factor 212 to image data 125 regardless of focal depth, for example. In this way, contribution from the image data 125 to a spatially compounded image 135 is not based on focal depth, for example.

Image processor 130 can apply one or more mathematical relationships between a weighting factor and focal depth for image data 125 corresponding to different ultrasound beams 112. For example, image processor 130 may receive image data 125 corresponding to several image frames of a spatially compounded image 135. Processor 130 may then apply different mathematical relationships between a weighting factor and focal depth in order to determine a different factor for image data 125 from each ultrasound beam 112.

For example, transducer 110 may receive right, left, and non-steered ultrasound beams 112, all with the same focal depth. Once image processor 130 receives image data 125 from each of the three beams 112, image processor 130 may apply the weighting factor determined by the relationship of curve 230 in FIG. 2A to image data 125 from the non-steered beam 112. Image processor 130 may also apply the weighting factor determined by the relationship of curve 230 in FIG. 2B to image data 125 from the left and right steered beams 112. In this way, the same weighting factor is applied to image data 125 from the steered beams 112 for all focal depths, for example. Therefore, image data 125 contributions from the steered beams 112 to a spatially compounded image 135 may not change for various focal depths. Conversely, for example, image data 125 contributions from non-steered beams 112 to a spatially compounded image 135 are weighted differently according to various focal depths.

For example, data 125 contributions from non-steered beams 112 at smaller focal depths are multiplied by a smaller factor (when curve 230 of FIG. 2A is applied). In this way, at a smaller focal depth (such as depth 222 of FIG. 2A), the application of curve 230 of FIG. 2A to the non-steered beam 112 image data 125 and the application of curve 230 of FIG. 2B to the steered beam 112 image data 125 results in data 125 from the steered beams 112 having a larger contribution to the spatially compounded image 135 than data 125 from the non-steered beams 112, for example. The contribution of image data 125 from the steered beams 112 is therefore weighted greater than the contribution of image data 125 from the non-steered beams 112, for example.

By applying differing weighting factor-focal depth relationships to steered and non-steered beams 112, system 100 may provide for a more uniform image. For example, if left, right, and non-steered image frames are used to create a spatially compounded image, and image data 125 from each of the frames are weighted equally (such as by multiplying image data 125 from each frame by the same factor or by 1), then the compounded image 135 is based on the full data 125 from all three frames. Conversely, if image data 125 from the center, or non-steered image frame in the near field is multiplied by a factor of 0.2 and image data 125 from the outer, or left and right steered frames in the near field is multiplied by a factor of 1, then the compounded image 135 is based on at least 2.2 frames, for example. The overall effect of data 125 from the non-steered image frame in the near field (which is more likely to contain reverberation artifacts) can be reduced in the compounded image 135. Similarly, by reducing the contribution of image data 125 from steered image frames in the far field, a sharper, less blurry image 135 may result.

The above example may also be applied to a larger number of input image frames, such as 5, 7 or 9 image frames. In addition, a different weighting curve 230 may be applied to image data 125 from each image frame (or ultrasound beam 112).

In another embodiment of the present invention, a weighting curve 230 may be used in conjunction with regional input frame weighting, as described above.

In another embodiment of the present invention, image processor 130 may determine whether or not to apply range-dependent weighting based on at least a steering angle of an ultrasound beam 112. For example, a steered ultrasound beam 112 can have a steering angle based on an angular difference between the steered beam 112 and a non-steered beam 112. The steering angle may be input by a user into image processor 130. The steering angle may also be communicated as image data 125 from data acquisition system 120 to image processor 130.

Image processor 130 may then compare the steering angle to a threshold angle. The threshold angle may be stored on a memory of image processor 130 or on a memory accessible by image processor 130. Image processor 130 can then apply range dependent weighting to image data 125 if the threshold angle is greater than the ultrasound beam 112 to which image data 125 derives. In this way, range dependent weighting can be applied to image data 125 only when the corresponding ultrasound beam 112 is within a threshold angular distance from a non-steered beam 112 direction.

Figure 3:
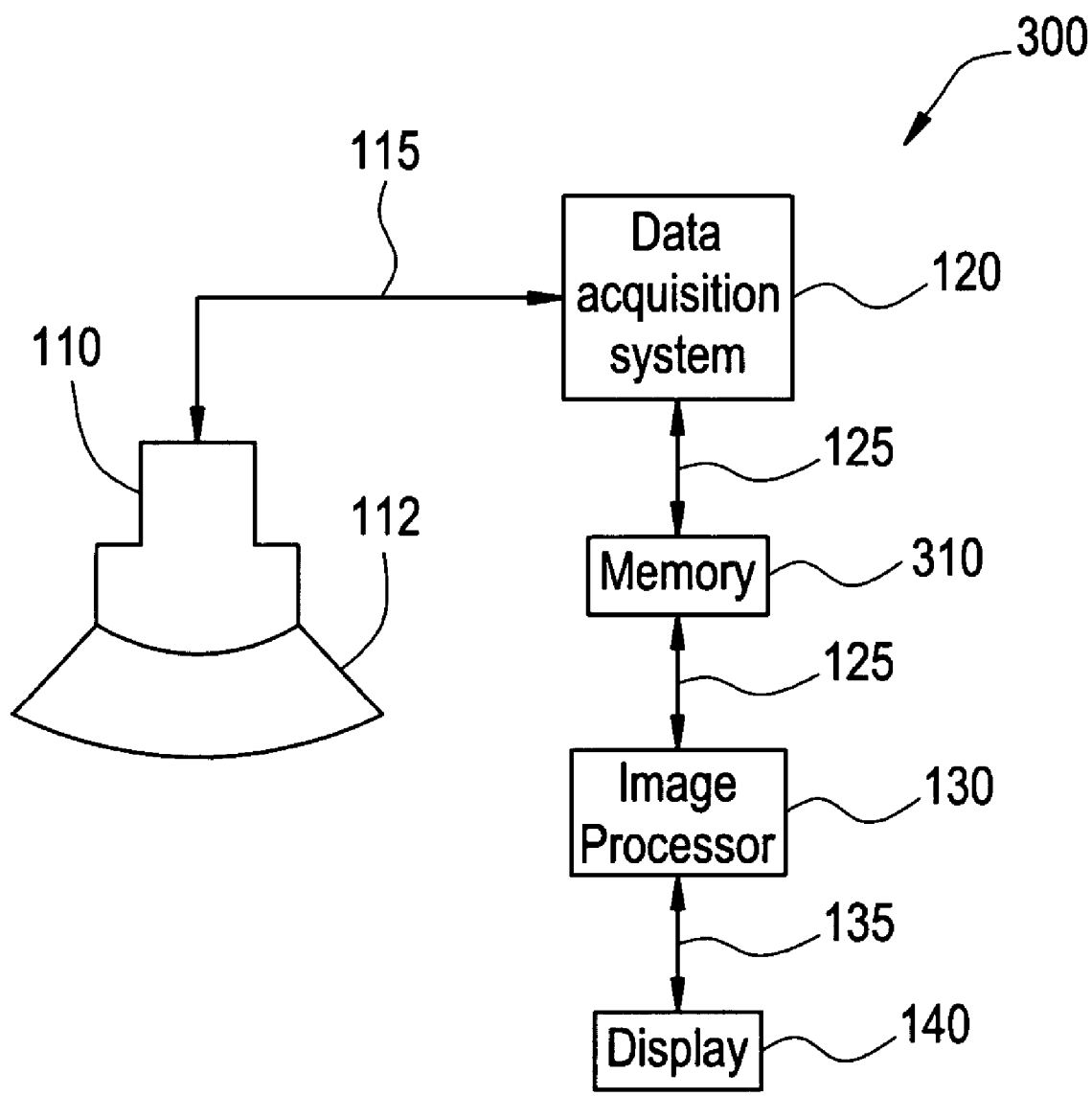
FIG. 3 illustrates a schematic diagram of the ultrasound imaging system including a memory according to an embodiment of the present invention.

In another embodiment of the present invention, system 100 may include a memory for storing image data 125. FIG. 3 illustrates system 100 including a memory 310 according to an embodiment of the present invention. System 300 is similar to system 100 of FIG. 1 with a memory 310 included. In system 300, image data 125 is communicated from data acquisition system 120 to a memory 310. Image data 125 is also communicated from memory 310 to image processor 130.

In operation, data acquisition system 120 communicates image data 125 to memory 310 in order for image data 125 to be stored. Memory 310 may include a computer accessible memory, for example. Image data 125 may be accessed and retrieved from memory 310 by image processor 130.

Image processor 130 may access and retrieve image data 125 from memory 310 based on at least a user input. For example, image processor 130 may include an input device, such as a mouse, keyboard, or touchscreen. A user may then direct image processor 130 to access memory 310 to retrieve image data 125, for example.

In addition, a user may direct image processor 130 to access memory 310 to retrieve image data 125 and apply or not apply weighting to the data, as described above. For example, a user may direct image processor 130 to access memory 310 to retrieve recently stored image data 125 and apply weighting to the image data 125, as described above in reference to FIGS. 2A, 2B, and 2C. Image processor 130 may then combine image data 125 with other image data 125 to form a compounded image 135 and communicate the image 135 to display 140 for display to user. Conversely, the user may direct image processor 130 to access memory 310 to retrieve the same stored image data 125 without applying weighting to the image data 125. Image processor 130 may then combine image data 125 with other image data 125 to form a compounded image 135 and communicate the image 135 to display 140 for display to user. In this way, a compounded image 135 can be displayed with and without range dependent weighting applied based on at least an input from a user.

As image data 125 may be stored on memory 310 for an extended period of time, range dependent weighting can be applied or removed from a spatially compounded image 135 after image data 125 has been acquired. In addition, range dependent weighting can be applied or removed after image data 125 is acquired, stored on memory 310, and then recalled from memory 310 into processor 130 based on at least user input, as described above. An input into processor 130 can allow a user to select either a range-weighted image 135 or non-range-weighted image 135 for display, or the display of both a range-weighted and non-range-weighted image 135. In this way, a user may direct image processor 130 to choose, in effect, one or more contributions of image data 125 to a spatially compounded image. A first contribution may include a first range-dependent weighting applied to image data 125 (such as the application of curve 230 of FIG. 2A), a second contribution may include no range dependent weighting of image data 125, and a third contribution may include a second range-dependent weighting applied to image data 125 (such as the application of curve 230 of FIG. 2C), for example.

Figure 4:
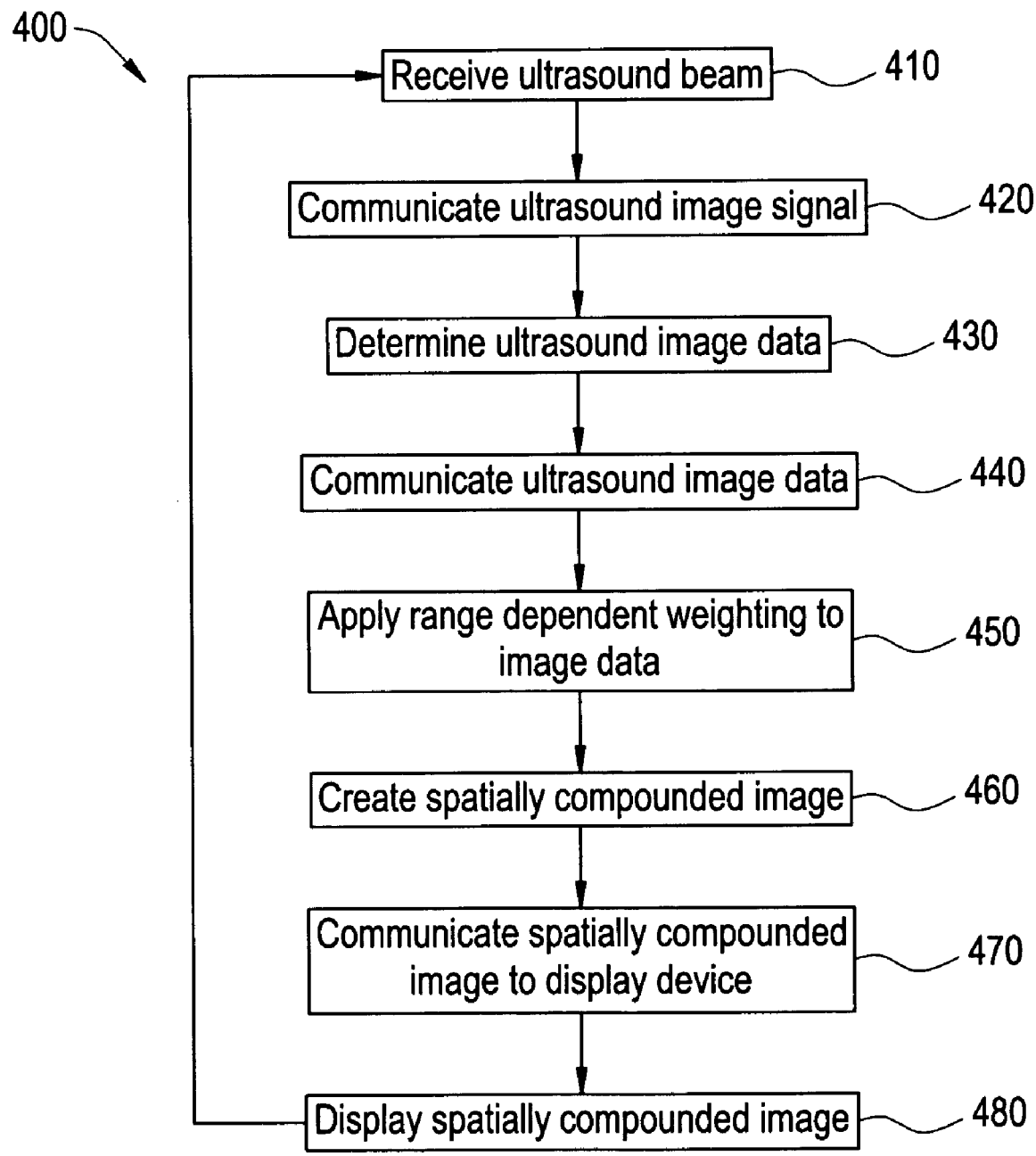
FIG. 4 illustrates flowchart for a method for applying range dependent weighting to ultrasound imaging.

FIG. 4 illustrates flowchart for a method 400 for applying range dependent weighting to ultrasound imaging. First, at step 410, an ultrasound beam 112 is received at a transducer array 110. Next, at step 420 an ultrasound image signal 115 is communicated to a data acquisition system 120. The acquisition system 120 then determines imaging data 125 based on at least imaging signal 115 at step 430.

Next, at step 440, the image data 125 is communicated to an image processor 130. The image processor 130 then applies range dependent weighting to the image data 125, as described above, at step 450. Next, at step 460, the image processor 130 uses weighted image data 125 to create a spatially compounded image 135.

The spatially compounded image 135 is then communicated to a display device at step 470. Next, at step 480, the image 135 is displayed on a display device 140.

Method 400 may then proceed back to step 410. In this way, method 400 may proceed in a loop starting with step 410 and ending with 480. Method 400 may terminate when a user desires to stop obtaining ultrasound image data 125 or when there are no more ultrasound beams 112 to be received, for example.

Figure 5:
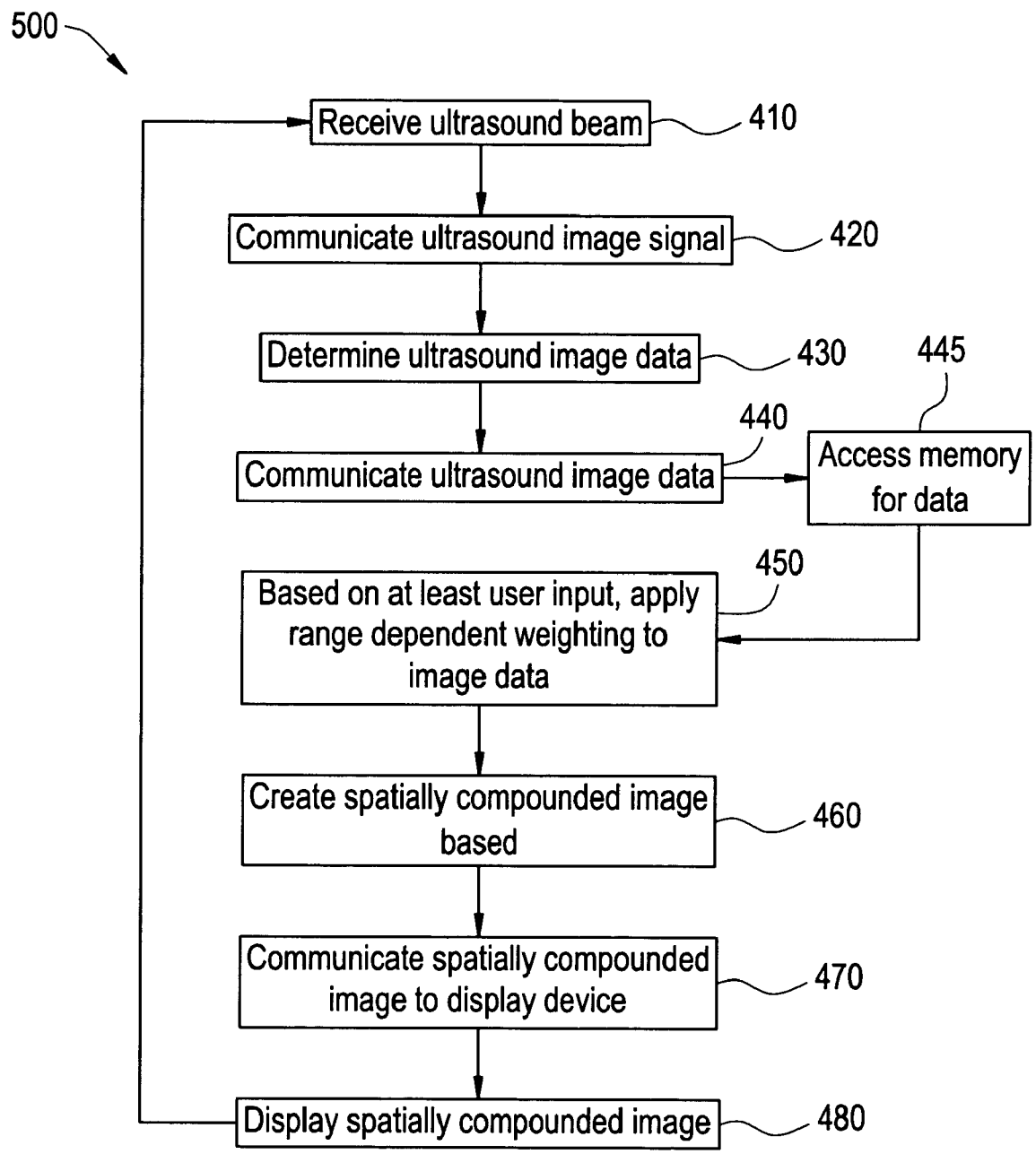
FIG. 5 illustrates a flowchart for a method for applying range dependent weighting to ultrasound imaging according to another embodiment of the present invention.
Figure 6:
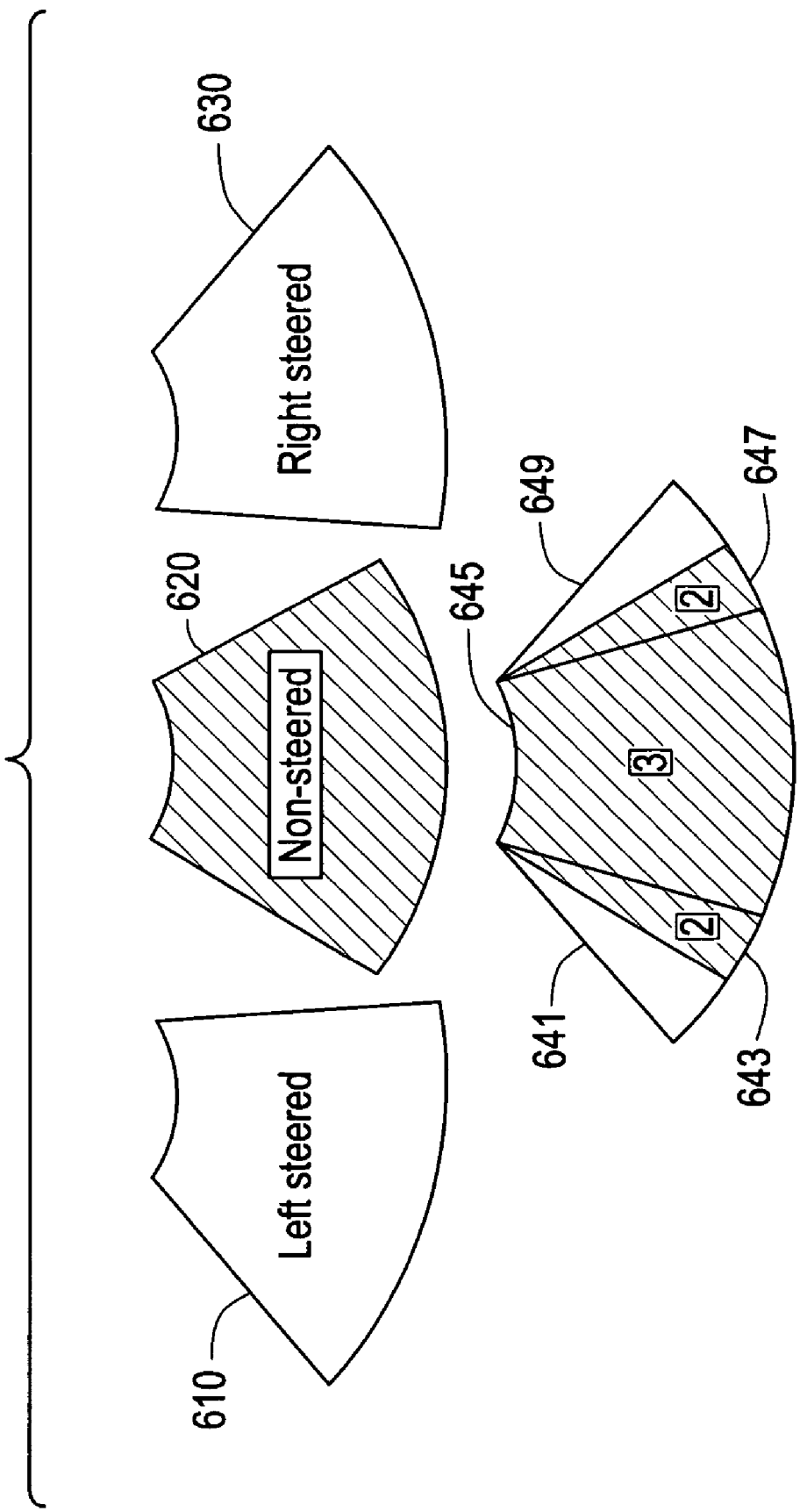
FIG. 6 illustrates a schematic diagram demonstrating regional input frame weighting.

FIG. 5 illustrates a flowchart for a method 500 for applying range dependent weighting to ultrasound imaging according to another embodiment of the present invention. Method 500 is similar to method 400. However, at step 440 in method 500, ultrasound image data 125 is communicated to and stored on a memory 310, as described above. Next, at step 445, image processor 130 accesses memory 310 to retrieve image data 125.

Next, at step 450, image processor 130 applies range dependent weighting to image data 125 based on at least user input, as described above. For example, if a user directs image processor 130 to apply range dependent weighting to image data 125, then image processor 130 applies the weighting at step 450. If, however, a user directs image processor 130 to not apply any range dependent weighting to image data 125, then no weighting is applied to image data 125 at step 450.

Next, at step 460, the image processor 130 uses either weighted or non-weighted image data 125 to create a spatially compounded image 135.

The spatially compounded image 135 is then communicated to a display device at step 470. Next, at step 480, the image 135 is displayed on a display device 140.

Similar to method 400, method 500 may then proceed back to step 410. In this way, method 400 may proceed in a loop starting with step 410 and ending with 480. Method 500 may terminate when a user desires to stop obtaining ultrasound image data 125 or when there are no more ultrasound beams 112 to be received, for example.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A system for range dependent weighting in ultrasound imaging, said system including:
    a transducer array receiving a first ultrasound beam;
    a data acquisition system receiving a first ultrasound imaging signal from said array, said first signal including first image data for a first image frame based on at least said first beam, wherein said first image data is over a first range, wherein said first image frame includes at least a first near field and a first far field, wherein a portion of said first image data is included in said first near field and another portion of said first image data is included in said first far field based on said first range;
    an imaging processor combining a first data contribution from said first image data with at least second image data for a second image frame from a second ultrasound imaging signal to create a spatially compounded image, wherein said second image data is over a second range, wherein said second image frame includes at least a second near field and a second far field, wherein a portion of said second image data is included in said second near field and another portion of said second image data is included in said second far field based on said second range; and
    a memory in communication with said imaging processor, said memory storing a threshold angle from a non-steered beam direction,
    wherein said imaging processor is configured to determine said first contribution based on a range-dependent weighting applied to said first image data over said first range if the threshold angle exceeds a steering angle of said first ultrasound beam,
    wherein said range-dependent weighting is applied to said first image data only when said steering angle is within said threshold angle from the non-steered beam direction.

2. The system of claim 1, wherein said first beam is a non-steered ultrasound beam.

3. The system of claim 2, further including a second ultrasound beam received at said array, said second ultrasound beam including a steered ultrasound beam, said second imaging signal based on at least said second beam,
    wherein a second data contribution from said second image data to said spatially compounded image differs from said first data contribution.

4. The system of claim 1, wherein said first data contribution is further based on a steering angle of said first beam.

5. The system of claim 1, further including:
    a memory for storing said first data contribution and a second data contribution from said first image data to said spatially compounded image;
    a display for displaying said spatially compounded image with at least one of said first and second data contributions applied to said spatially compounded image; and
    an input device enabling a user to choose displaying said spatially compounded image with at least one of said first and second data contributions applied to said spatially compounded image.

6. The system of claim 5, wherein said second data contribution is not based on a range-dependent weighting.

7. A method for applying range dependent weighting to ultrasound imaging, said method including:
    receiving through a transducer array a first ultrasound imaging signal based on at least a first ultrasound beam, said first imaging signal including first image data for a first image frame, wherein said first image data is over a first range, wherein said first image frame includes at least a first near field and a first far field, wherein a portion of said first image data is included in said first near field and another portion of said first image data is included in said first far field based on said first range; and
    using a processor to combine a first data contribution from said first image data with at least a second data contribution from second image data for a second image frame, said second image data based on at least a second ultrasound imaging signal to create a spatially compounded image, wherein said second image data is over a second range, wherein said second image frame includes at least a second near field and a second far field, wherein a portion of said second image data is included in said second near field and another portion of said second image data is included in said second far field based on said second range,
    wherein said first data contribution from said first image data to said spatially compounded image is based on a range-dependent weighting applied to said first image data over said first range if a threshold angle from a non-steered beam direction exceeds a steering angle of said first ultrasound beam, wherein said range-dependent weighting is applied to said first image data only when said steering angle is within said threshold angle from the non-steered beam direction.

8. The method of claim 7, wherein said first beam is a non-steered ultrasound beam.

9. The method of claim 8, wherein said receiving step includes receiving said second imaging signal based on at least a second ultrasound beam, said second beam including a steered ultrasound beam,
    wherein a second data contribution from said second image data to said spatially compounded image differs from said first data contribution.

10. The method of claim 7, wherein said first data contribution is further based on a steering angle of said first beam.

11. The method of claim 7, further including:
    storing said first data contribution and a second data contribution from said first image data to said spatially compounded image;
    applying at least one of said first and second contributions to said spatially compounded image; and
    displaying said spatially compounded image.

12. The method of claim 11, wherein said second data contribution is not based on a range-dependent weighting.

13. A method for weighing data contributions to a spatially compounded image, said method including:
    using a processor to reduce a first image data contribution of a first image data for a first image frame to a spatially compounded image by a first factor, said first factor based on a range-dependent weighting if a threshold angle from a non-steered beam direction exceeds a steering angle of a first ultrasound beam, wherein said range-dependent weighting is applied to said first image data only when said steering angle is within said threshold angle from the non-steered beam direction, wherein said first image data is over a first range, wherein said first image frame includes at least a first near field and a first far field, wherein a portion of said first image data is included in said first near field and another portion of said first image data is included in said first far field based on said first range, wherein said range-dependent weighting is applied to said first image data over said first range; and using the processor to combine said first image data contribution and a second image data contribution to create a spatially compounded image.

14. The method of claim 13, further including reducing said second image data contribution of a second image data for a second image frame by a second factor, said second factor based on a second range-dependent weighting, wherein said second image data is over a second range, wherein said second image frame includes at least a second near field and a second far field, wherein a portion of said second image data is included in said second near field and another portion of said second image data is included in said second far field based on said second range, wherein said second range-dependent weighting is applied to said second image data over said second range.

15. The method of claim 13, wherein said first image data derived from at least an ultrasound beam.

16. A method for generating a spatially compounded image, the method including:

receiving a first image frame based on a first ultrasound beam received by a transducer array, wherein the first image frame includes image data over a first range, wherein the first image frame includes at least a first near field and a first far field, wherein a portion of said image data over said first range is included in said first near field and another portion of said image data over said first range is included in said first far field based on said first range;

receiving a second image flame based on a second ultrasound beam received by the transducer array, wherein the second image frame includes image data over a second range, wherein the second image frame includes at least a second near field and a second far field, wherein a portion of said image data over said second range is included in said second near field and another portion of said image data over said second range is included in said second far field based on said second range;

using at least one processor to determine a first contribution of the first image frame based on a first range-dependent weighting applied to the image data over the first range if a first threshold angle from a non-steered beam direction exceeds a first steering angle of the first ultrasound beam, wherein said first range-dependent weighting is applied to the image data only when said first steering angle is within said first threshold angle from the non-steered beam direction;

using the at least one processor to determine a second contribution of the second image frame based on a second range-dependent weighting applied to the image data over the second range; and using the at least one processor to generate a spatially compounded image based on the first contribution and the second contribution.

17. The method of claim 16, further including generating a second spatially compounded image based on the first image frame and the second image frame, wherein the second spatially compounded image is not determined based on a range-dependent weighting.

18. The method of claim 17, further including displaying the spatially compounded image and the second spatially compounded image.

19. The method of claim 16, wherein the first ultrasound beam is a non-steered beam and the second ultrasound beam is a steered beam.

20. The method of claim 16, wherein the first range-dependent weighting provides for a smaller contribution of image data in the first near field and a full contribution of image data in the first far field.

* * * * *

UNITED STATES PATENT AND TRADEMARK OFFICE
CERTIFICATE OF CORRECTION

| | | |
|---|---|---|
| PATENT NO. | : 7,632,229 B2 | Page 1 of 1 |
| APPLICATION NO. | : 10/914326 | |
| DATED | : December 15, 2009 | |
| INVENTOR(S) | : Washburn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this

Second Day of November, 2010

David J. Kappos
*Director of the United States Patent and Trademark Office*